United States Patent Office 3,361,730
Patented Jan. 2, 1968

3,361,730
PROCESS AND CATALYST FOR PRODUCTION OF POLYBUTADIENE
Floyd E. Naylor, Bartlesville, Okla., assignor to Phillips Petroleum Company, a corporation of Delaware
No Drawing. Filed May 1, 1964, Ser. No. 364,286
9 Claims. (Cl. 260—94.3)

This invention relates to the polymerization of butadiene to form cis-1,4-polybutadiene. In one aspect, it relates to an improved catalyst for use in such a polymerization.

The use of certain organometal catalysts to promote the polymerization of conjugated diolefins has attained great importance in the rubber industry in recent years. One of the advantages of certain catalysts of this type is that they can be used to control the molecular structure of the polymers obtained so that polymers having 85 percent and more cis-1,4 structure are obtainable. This type of polymer has many advantages over other polymers of butadiene, particularly in the production of automobile tires. Properly compounded cis-polybutadiene has outstandingly good tensile strength, abrasion resistance, and low heat build-up.

While a great assortment of organometal catalysts is now known to be operative for the polymerization of olefins generally, relatively few selectively promote the formation of cis-polybutadiene and there appears to be no method of predicting in advance which catalysts will so function and which will not.

One of the problems encountered in the production and use of cis-polybutadiene is the problem of cold flow. This is primarily a problem of storage of the uncompounded and unvulcanized polymer. This polymer, in many cases, has the property of flowing slowly at room temperature so that it becomes impractical to store the material in unwrapped bales or crates.

One method of solving the cold-flow problem which has proven effective is to conduct the polymerization in two stages, the first of which is conducted at a temperature in the range of 20 to 80° F. to achieve at least a 40 percent (but incomplete) conversion of the monomer and to continue the polymerization in at least one subsequent stage at a temperature in the range 80 to 200° F., and at least 20 Fahrenheit degrees above the temperature in the first step, the final conversion being at least 80 percent. This type of operation has been successfully conducted utilizing a catalyst prepared by mixing a trialkylaluminum, a titanium halide selected from the group consisting of the bromides and chlorides of titanium, and elemental iodine. This type of operation is more fully described in copending application Ser. No. 260,856 filed Feb. 25, 1963.

While the technique of conducting the polymerization at progressively increasing temperatures is effective in reducing cold flow of the product, it also appears to effect an isomerization of the polymer so that the cis-1,4 content is decreased and the trans-1,4 content increased, as compared to the polymer produced at a substantially constant but lower polymerization temperature.

An object of this invention is to produce improved cis-1,4 polybutadiene. A further object is to decrease cold flow of cis-1,4 polybutadiene. A further object of the invention is to prevent decrease of the cis-1,4 content of a polybutadiene produced in the presence of an organometal catalyst. An additional object of the invention is to provide an improved catalyst for the polymerization of butadiene. Other objects and advantages will become apparent to those skilled in the art on studying this disclosure.

According to this invention there is provided a catalyst which is obtained by commingling a compound having the formula $RLi_x$, a compound having the formula $R_nAlI_m$ and a compound having the formula $TiX_4$. In the foregoing formulae, R represents a hydrocarbon radical selected from the group consisting of aliphatic, cycloaliphatic and aromatic hydrocarbon radicals having from 1 to 20 carbon atoms; $x$ is an integer in the range 1 to 4; $m$ and $n$ are integers the sum of which is 3 and each of which is at least 1; and X is a halogen selected from the group consisting of chlorine, bromine and iodine. Frequently, R is an alkyl radical having from 1 to 10 carbon atoms and X is chlorine.

Further in accordance with this invention, a catalyst as hereinbefore described is utilized to polymerize 1,3-butadiene to form rubbery cis-1,4 polybutadiene in which the cis-1,4 content is at least 85 percent.

In one embodiment of this invention, the polymerization is conducted in two stages, with rising temperature during the course of the polymerization, as more particularly defined hereinbefore. I have found that, in contrast to catalysts previously used in a process of the type described, the catalyst of this invention produces a polymer in which the cis-1,4 content is not decreased by the rising temperature technique.

Organolithium compounds applicable in this invention include isopropyllithium, n - butyllithium, sec - butyllithium, tert - butyllithium, n - amyllithium, tert - octyllithium, n - decyllithium, phenyllithium, 2 - naphthyllithium, 4 - butylphenyllithium, p - tolyllithium, 4 - phenylbutyllithium, cyclohexyllithium, 4 - butylcyclohexyllithium, 4 - cyclohexylbutyllithium, 1,4 - dilithiobutane, 1,10-dilithiodecane, 1,20 - dilithioeicosane, 1,4 - dilithiocyclohexane, 1,4 - dilithio - 2 - butene, 1,8 - dilithio - 3 - decene, 1,4 - dilithiobenzene, 1,2 - dilithio - 1,2 - diphenylethane, 1,2 - dilithio - 1,8 - diphenyloctane, 1,3,5 - dilithiopentane, 1,5,15 - trilithioeicosane, 1,2,4 - trilithiocyclohexane, 1,3,5,8 - tetralithiodecane, 1,5,10,20 - tetralithioeicosane, 1,2,3,5 - tetralithiocyclohexane, 4,4' - dilithiobiphenyl, and dilithiummethylnaphthalene adduct.

Organoaluminum iodides include: diethylaluminum iodide, methylaluminum diiodide, isobutylaluminum sesquiiodide, di-n-decylaluminum iodide, cyclohexylaluminum diiodide, dieicosylaluminum iodide, diphenylaluminum iodide, and benzylaluminum diiodide.

The quantity of organolithium compound utilized in the catalyst systems of this invention is preferably in the range of 0.9 to 5 gram atoms of lithium per gram atom of iodine in the organometal iodide, but proportions outside this range are operative.

The total quantity of organometal compounds, i.e., organolithium plus organoaluminum iodide, is preferably in the range of 2 to 20 moles of organometal compounds per mole of titanium tetrahalide, but proportions outside this range are operative.

The quantity of titanium tetrahalide is preferably in the range of 0.25 to 2 moles of titanium tetrahalide per gram atom of iodine in the organometal iodide.

The concentration of total catalyst used in the present process can vary over a rather wide range and is generally expressed in terms of the organolithium compound plus the organometal iodide. The catalyst concentration is generally in the range of 1 to 20 millimoles total organometal compounds per 100 grams of butadiene to be polymerized. The actual catalyst concentration used is, in general, determined by the molecular weight of the product which is desired, low concentrations favoring relatively high molecular weights and vice versa.

The polymerization process of this invention can be carried out at temperatures within a wide range, e.g., from −73° to +121° C. (−100° to 250° F.). It is usually preferred to operate at a temperature in the range of −34 to +71° C. (−30° to +160° F.), 0° to 60° C. being highly satisfactory.

As in previously known polymerization processes, the process of this invention can advantageously be conducted with the monomer in solution in a hydrocarbon which is chemically inert and liquid under the reaction conditions. Furthermore, the invention can be practiced with the butadiene forming most of the liquid phase reaction medium with no diluent. Suitable diluents are paraffinic hydrocarbons having up to 20 carbon atoms per molecule, cycloparaffinic hydrocarbons of the same general type and aromatic hydrocarbons.

A series of runs, representing specific embodiments of this invention, was made for the polymerization of 1,3-butadiene in the presence of a catalyst formed on admixing n-butyllithium, diethylaluminum iodide, and titanium tetrachloride. Toluene was employed as the diluent. Different amounts of n-butyllithium and diethylaluminum iodide were utilized while the titanium tetrachloride was held constant. In each run 100 parts by weight of 1,3-butadiene and 1000 parts by weight of toluene were used. Toluene was charged first. The reactor was then purged with nitrogen. Butadiene was added, followed by the diethylaluminum iodide, the butyllithium, and finally the titanium tetrachloride. At the close of the polymerization period, the reaction was shortstopped with two parts by weight, per 100 parts butadiene charged, of 2,2'-methylene-bis(4-methyl-6-tert-butylphenol) dissolved in a solvent made up of equal volumes of isopropyl alcohol and toluene. The polymer was subsequently coagulated by addition of isopropyl alcohol, separated, and dried. Two control runs were made in which the catalyst was formed on admixing triisobutylaluminum, elemental iodine, and titanium tetrachloride. The proportions of catalyst components, polymerization conditions, and results are shown in Table I. In the table "n-BuLi" is n-butyllithium, "DEAI" is diethylaluminum iodide, "TTC" is titanium tetrachloride, "TBA" is triisobutylaluminum, and "mhm" is millimoles per 100 grams monomer.

The data show that high-cis-polymers are produced when operating according to the process of the invention. In runs 7 and 8 the polymerization time was the same but in run 7 the temperature was increased during the last half of the reaction period, and the cold flow was lowered. Likewise in runs 9 and 10 the cold flow was lowered by using a higher temperature during the latter part of the runs. In all four runs (7, 8, 9, and 10) the cis content was high, trans was relatively low, and vinyl was essentially constant. A comparison of control runs 11 and 12 shows that the cold flow was reduced when the temperature was increased during the latter part of the run, but the trans content was increased, and there was a decrease in cis content. A comparison of runs 9 and 11 shows lower cold flow on using the catalyst system of the invention. Also, the increase in temperature had much less effect of trans content than in the control run. A comparison of runs 8 and 12 shows lower cold flow and higher cis on operating with the catalyst system of the invention.

TABLE I

| Run No. | n-BuLi, mhm. | DEAI, mhm. | TTC, mhm. | BuLi/DEAI, mole ratio | BuLi+DEAI/TTC, mole ratio | TTC/DEAI, mole ratio | Temp., °C. | Time, hours |
|---|---|---|---|---|---|---|---|---|
| 1 | 1.2 | 1.2 | 0.45 | 1/1 | 5.3/1 | 0.38/1 | 5 | 1.25 |
| 2 | 1.8 | 1.2 | 0.45 | 1.5/1 | 6.7/1 | 0.38/1 | 5 | 2 |
| 3 | 1.8 | 1.0 | 0.45 | 1.8/1 | 6.2/1 | 0.45/1 | 5 | 2 |
| 4 | 1.8 | 0.8 | 0.45 | 2.25/1 | 5.8/1 | 0.56/1 | 5 | 2 |
| 5 | 1.8 | 0.6 | 0.45 | 3/1 | 5.3/1 | 0.75/1 | 5 | 2 |
| 6 | 1.8 | 1.2 | 0.45 | 1.5/1 | 6.7/1 | 0.38/1 | 5 | 1 |
| 7 | 1.8 | 1.2 | 0.45 | 1.5/1 | 6.7/1 | 0.38/1 | [1] 5, 50 | 1, 1 |
| 8 | 1.8 | 1.2 | 0.45 | 1.5/1 | 6.7/1 | 0.38/1 | 5 | 2 |
| 9 | 1.8 | 1.2 | 0.45 | 1.5/1 | 6.7/1 | 0.38/1 | [2] 5, 50 | 2, 1.5 |
| 10 | 2.2 | 1.4 | 0.45 | 1.57/1 | 8/1 | 0.32/1 | [3] 5, 50 | 2, 1 |

| Run No. | Conv., percent | Cold Flow, mg./min. | Mooney ML-4 at 212° F. | Inh. Visc. | Gel, percent | Microstructure, percent | | |
|---|---|---|---|---|---|---|---|---|
| | | | | | | cis | trans | Vinyl |
| 1 | 66 | | | 3.72 | | 93.4 | 3.8 | 2.8 |
| 2 | 85 | | | 3.12 | 0 | 95.5 | 1.2 | 3.3 |
| 3 | 84 | | | 3.53 | 0 | 95.7 | 1.0 | 3.3 |
| 4 | 69 | | | 3.87 | 0 | 95.9 | 0.9 | 3.2 |
| 5 | 66 | | | 4.17 | 0 | 96.0 | 0.8 | 3.2 |
| 6 | 80 | 2.5 | 70 | 2.99 | 0 | 95.2 | 1.5 | 3.3 |
| 7 | 96 | 0.4 | 77 | 3.07 | 0 | 94.5 | 2.1 | 3.4 |
| 8 | 85 | 1.6 | 76 | 3.14 | 0 | 95.4 | 1.3 | 3.3 |
| 9 | 95 | 0.0 | 95 | 3.40 | 0 | 94.8 | 1.9 | 3.3 |
| 10 | 91 | 1.0 | 89 | 3.47 | 0 | 95.2 | 1.3 | 3.5 |

CONTROL RUNS

| Run No. | TBA, mhm. | $I_2$, mhm. | TTC, mhm. | $TBA/I_2$, mole ratio | $R_3Al/TTC$, mole ratio | $TTC/I_2$, mole ratio | Temp., °C. | Time, hours |
|---|---|---|---|---|---|---|---|---|
| 11 | 2.7 | 0.9 | 0.45 | 3/1 | 6/1 | 0.5/1 | [3] 5, 50 | 2, 1 |
| 12 | 2.7 | 0.9 | 0.45 | 3/1 | 6/1 | 0.5/1 | 5 | 2 |

CONTROL RUNS

| Run No. | Conv., percent | Cold Flow mg./min. | Mooney ML-4 at 212° F. | Inh. Vis. | Gel, percent | Microstructure, percent | | |
|---|---|---|---|---|---|---|---|---|
| | | | | | | cis | trans | Vinyl |
| 11 | 95 | 2.4 | 42 | 2.32 | 0 | 91.9 | 4.7 | 3.4 |
| 12 | 84 | 9.7 | 31 | 2.20 | 0 | 93.9 | 2.6 | 3.5 |

[1] Polymerization at 5° C. for 1 hour and 50° C. for 1 hour.
[2] Polymerization at 5° C. for 2 hours and 50° C. for 1.5 hours.
[3] Polymerization at 5° C. for 2 hours and 50° C. for 1 hour.

Other specific catalyst systems according to this invention are: methyl lithium, methyl aluminum diiodide, and titanium tetrachloride; isopropyl lithium, isobutyl aluminum sesquiiodide, and titanium tetrabromide; sec-butyl lithium, di-n-decyl aluminum, and titanium tetrachloride; and phenyl lithium, dicyclohexyl aluminum iodide, and titanium tetraiodide.

I claim:

1. A process which comprises polymerizing butadiene to form a rubbery polymer containing at least 85 percent cis-1,4 addition, in the presence of a catalyst which forms on mixing a compound having the formula $RLi_x$, a compound having the formula $R_nAlI_m$, and a compound having the formula $TiX_4$, wherein R is a hydrocarbon radical selected from the group consisting of aliphatic, cycloaliphatic and aromatic radicals having from 1 to 20 carbon atoms, $x$ is an integer in the range 1 to 4, $m$ and $n$ are integers each of which is at least 1 and the sum of which is 3, and X is a halogen selected from the group consisting of chlorine, bromine, and iodine, wherein said polymerizing is carried out in at least a two step polymerization process with the polymerization temperature in the second polymerization step being at least 20° F. higher than the polymerization temperature in the first polymerization step and the conversion of monomer into polymer being at least 40 percent in said first polymerization step, said polymer having a stereo configuration approximately the same as and less tendency to cold flow than a polymer made without the two step polymerization temperature process.

2. A process which comprises polymerizing 1,3-butadiene in the presence of a catalyst which forms on commingling a compound having the formula RLi, a compound having the formula $R_nAlI_m$, and titanium tetrachloride, wherein R is an alkyl radical having from 1 to 10 carbon atoms, $m$ and $n$ are integers each of which is at least 1 and the sum of which is 3, wherein said polymerizing is carried out in at least a two step polymerization process with the polymerization temperature in the second polymerization step being at least 20° F. higher than the polymerization temperature in the first polymerization step and the conversion of monomer into polymer being at least 40 percent in said first polymerization step, said polymer having a stereo configuration approximately the same as and less tendency to cold flow than a polymer made without the two step polymerization temperature process.

3. A process according to claim 2 wherein the ratio of RLi to the iodine in the $R_nAlI_m$ compound is within the range 0.9:1 to 5:1 gram atoms of lithium per gram atom of iodine, and the ratio of the sum of the moles of the RLi and the $R_nAlI_m$ compound to titanium tertachloride is in the range 2:1 to 20:1, the polymerization is conducted at a temperature in the range −34 to +71° C., and the total concentration of catalyst ingredients supplied to the reaction mixture is in the range 1 to 20 millimoles of RLi plus $R_nAlI_m$ per hundred grams of butadiene.

4. A process which comprises polymerizing 1,3-butadiene to form a rubbery polymer containing at least 85 percent cis-1,4 addition, at a temperature in the range 0 to 60° C., in the presence of a catalyst which forms on mixing n-butyl-lithium, diethylaluminum iodide and titanium tetrachloride, the ratio of n-butyllithium to said iodide being in the range 0.9:1 to 5:1 gram atoms of lithium per gram atom of iodine and the ratio of the total moles of n-butyllithium and diethylaluminum iodide to titanium tetrachloride being in the range 2:1 to 20:1, and the total concentration of catalyst ingredients supplied to the reaction mixture being in the range 1 to 20 millimoles of RLi plus $R_nAlI_m$ per hundred grams of butadiene, wherein said polymerizing is carried out in at least a two step polymerization process with the polymerization temperature in the second polymerization step being at least 20° F. higher than the polymerization temperature in the first polymerization step and the conversion of monomer into polymer being at least 40 percent in said first polymerization step, said polymer having a stereo configuration approximately the same as and less tendency to cold flow than a polymer made without the two step polymerization temperature process.

5. A process according to claim 4 wherein at least 40 percent of the butadiene is polymerized at a temperature in the range 20 to 80° F. and the reaction is completed at a temperature in the range 80 to 200° F. to effect at least 80 percent total conversion.

6. A process according to claim 1 wherein the catalyst is one which forms on commingling tert-amyllithium, methylaluminum diiodide and titanium tetrachloride.

7. A process according to claim 1 wherein the lithium compound is isopropyllithium, the aluminum compound is isobutylaluminum sesquiiodide and the titanium halide is titanium tetrabromide.

8. A process according to claim 1 wherein the catalyst is one which forms on commingling secondary-butyllithium di-n-decylaluminum iodide and titanium tetrachloride.

9. A process according to claim 1 wherein the catalyst is one which forms on commingling phenyllithium, dicyclohexylaluminum iodide and titanium tetraiodide.

References Cited

UNITED STATES PATENTS

| | | | |
|---|---|---|---|
| 2,996,459 | 8/1961 | Andersen et al. | 260—94.2 |
| 3,031,424 | 4/1962 | Holmes et al. | 260—94.2 |

FOREIGN PATENTS

| | | |
|---|---|---|
| 879,284 | 10/1961 | Great Britain. |
| 931,579 | 7/1963 | Great Britain. |

JOSEPH L. SCHOFER, *Primary Examiner.*

H. I. CANTOR, W. F. HAMROCK, *Assistant Examiners.*